UNITED STATES PATENT OFFICE.

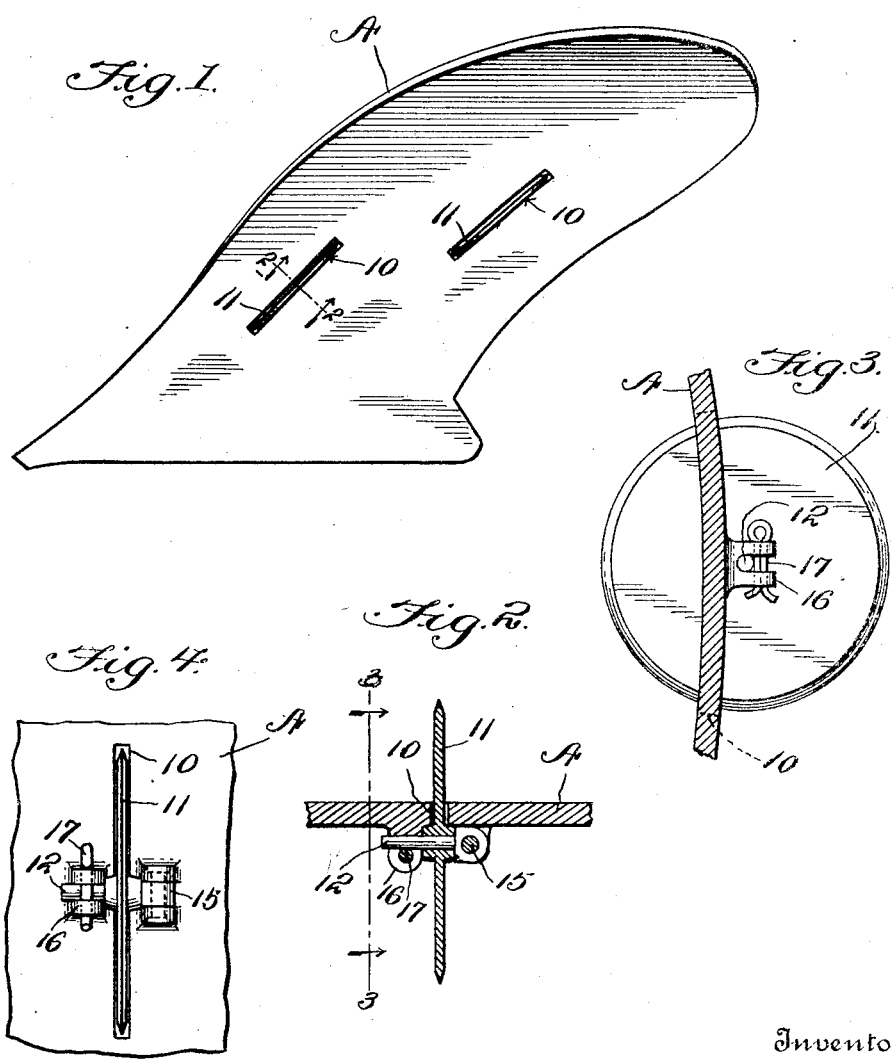

ARTHUR O. WHITE, OF GREENSBURG, INDIANA.

PLOW.

1,337,868.     Specification of Letters Patent.     Patented Apr. 20, 1920.

Application filed June 3, 1919. Serial No. 301,378.

*To all whom it may concern:*

Be it known that I, ARTHUR O. WHITE, a citizen of the United States, residing at Greensburg, in the county of Decatur and State of Indiana, have invented new and useful Improvements in Plows, of which the following is a specification.

This invention comprehends the provision for attachment for plows, and embodies one or more cutting disks arranged to rotate in planes at right angles to the line of cut of the plow, for the purpose of cutting and breaking the turned up portion of the ground that moves against the mold board.

In carrying out my invention I also provide for the removal of the cutting disks from the mold board when it is desired to sharpen the disks, or for any other purpose.

In the drawing forming part of this specification like numerals of reference indicate similar parts in the several views and wherein:—

Figure 1 is a view of the mold board showing the cutting disks associated therewith.

Fig. 2 is a transverse sectional view taken in line 2—2 of Fig. 1.

Fig. 3 is a sectional view taken on line 3—3 of Fig. 2 looking in the direction of the arrow.

Fig. 4 is a fragmentary rear elevation of the mold board showing one of the cutting disks mounted thereon.

In carrying out my invention, I provide the mold board indicated at A with a number of angularly disposed slots 10 and into which is arranged a cutting disk 11. Each disk 11 is journaled for rotation upon a rod or shaft 12 which extends transversely across the slot 10. The disks are provided to cut and break the turned up portion of the ground which passes over the mold board as the plow progresses, and consequently the cutting disks 11 rotate in planes substantially at right angles through the line of cut of the plow. This obviously eliminates the cross plowing which is a necessity with plows of usual construction, in order to make a more perfect seed bed. It might here be stated, that the shape as well as the number of disks used with a single mold board can be varied without departing from the spirit of my invention. By reason of a fact that the disks are mounted for rotation, they will not tend to impede nor add to the draft of the plow, and will not become clogged by gathering stones, roots or other foreign matter. In other words, should the disks strike a stone or a hard root during the process of the plow, the disks by being rotatable will pass beneath the stone or the like, thus preventing any binding or impeding of the draft of the plow, which would obviously occur with a stationary cutting element.

The rod or axle 12 for each disk is by preference hingedly mounted upon the mold board A as at 15, while the free end of the axle is secured in the bearings 16 in any suitable manner such as indicated as at 17, to permit the axle 12 to be swung to a position, where the disk can be moved from the axle when it is desired to sharpen the disk or for any other purpose. The revolving disks are particularly advantageous when used in connection with motor plows, as the head of the plow does not endanger the breaking of the disk, but causes the disk to work more perfectly, as the turned up ground or soil strikes the disk more rapidly and the turned up ground is readily cut or broken.

While I have shown and described what I consider the preferred embodiment of the invention I desire to have it understood that I do not limit myself in this connection, and that such changes may be resorted to when desired and fall within the scope of what is claimed.

What I claim, is:—

1. In a plow, the combination with a mold board, having a slot, of spaced lugs projecting from one side of the mold board and at one side of said slot, a shaft having one end pivoted between said lugs and adapted to extend across said slot, a disk removably mounted upon said shaft and arranged to rotate within the slot, for cutting the turned up portion of ground as it passes over the mold board, and means for securing the opposite end of said shaft to the mold board to hold said parts fixed relatively.

2. In a plow, the combination with a mold board, having a slot, of spaced lugs projecting from the mold board at each side of the slot, a shaft having one end pivoted between said lugs at one side of the slot, the shaft being adapted to extend across the slot and have its opposite end received by the other of said lugs, means for holding the latter mentioned end of the shaft in said lugs, a disk removably mounted upon said shaft and arranged to rotate within said slot for cutting the turned up portion as it passes over the mold board.

In testimony whereof I affix my signature.

ARTHUR O. WHITE.